(12) United States Patent
Kozawa

(10) Patent No.: US 11,893,397 B2
(45) Date of Patent: Feb. 6, 2024

(54) NON-TRANSITORY COMPUTER-READABLE RECORDING MEDIUM, CONTROL METHOD, AND INFORMATION PROCESSING DEVICE

(71) Applicant: FUJITSU LIMITED, Kawasaki (JP)

(72) Inventor: Makoto Kozawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 114 days.

(21) Appl. No.: 17/833,932

(22) Filed: Jun. 7, 2022

(65) Prior Publication Data
US 2023/0109625 A1 Apr. 6, 2023

(30) Foreign Application Priority Data
Oct. 1, 2021 (JP) .................. 2021-162504

(51) Int. Cl.
*G06F 9/44* (2018.01)
*G06F 9/445* (2018.01)

(52) U.S. Cl.
CPC ................. *G06F 9/44589* (2013.01)

(58) Field of Classification Search
CPC .................................................. G06F 9/44589
See application file for complete search history.

(56) References Cited

U.S. PATENT DOCUMENTS

| 7,095,342 B1* | 8/2006 | Hum ................... H03M 7/3084 341/51 |
| 2004/0210750 A1* | 10/2004 | Chheda ................ G06F 9/4403 713/1 |
| 2013/0145128 A1* | 6/2013 | Schardt ................ G06F 9/3851 712/E9.033 |
| 2018/0285569 A1 | 10/2018 | Spanjers |

FOREIGN PATENT DOCUMENTS

| JP | 2018-173936 A | 11/2018 |
| JP | 2020-187649 A | 11/2020 |

* cited by examiner

*Primary Examiner* — Stefan Stoynov
(74) *Attorney, Agent, or Firm* — Fujitsu Intellectual Property Center

(57) ABSTRACT

Provided is a non-transitory computer-readable recording medium that stores a control program causing a computer to execute a process, the process including determining whether first microcode stored in a first area of a storage device supports a processor, and when the first microcode does not support the processor, decompressing one of multiple sets of compressed second microcode stored in a second area of the storage device into the first area.

6 Claims, 7 Drawing Sheets

FIG. 4A

| TYPE OF CPU | CODE |
|---|---|
| A | 10 |
| B | 11 |
| C | 12 |

FIG. 4B

<COMPRESSION ORDER TABLE>

| INDEX | ADDRESS OFFSET | DESCRIPTION |
|---|---|---|
| 0 | 0000h | FOR A |
| 1 | 0350h | FOR B |
| 2 | 0850h | FOR C |

NON-TRANSITORY COMPUTER-READABLE RECORDING MEDIUM, CONTROL METHOD, AND INFORMATION PROCESSING DEVICE

CROSS-REFERENCE TO RELATED APPLICATION

This application is based upon and claims the benefit of priority of the prior Japanese Patent Application No. 2021-162504, filed on Oct. 1, 2021, the entire contents of which are incorporated herein by reference.

FIELD

A certain aspect of embodiments described herein relates to a non-transitory computer-readable recording medium, a control method, and an information processing device.

BACKGROUND

BIOS (Basic Input/Output System) is firmware built in the motherboard or system board of a computer. The BIOS starts the OS (operating system) after initializing the CPU (central processing unit) and memories.

The BIOS is stored in a ROM (read only memory) of a size determined by the CPU architecture. For example, in the case of the intel 64 and IA-32 architecture, the size of the ROM is 16 MB, and is fixed. The ROM in which the BIOS is stored stores microcode, which is firmware for the CPU. Microcode is a program defined for each CPU type, and microcode for a certain type of CPU cannot be used by another type of CPU. Thus, when the BIOS supports more than one type of CPUs, microcode for each CPU type is stored in the ROM in advance.

However, as CPUs are more sophisticated, the scale of the microcode is becoming larger, and it is becoming more difficult to store multiple sets of microcode in the ROM. Note that the technique related to the present disclosure is also disclosed in Japanese Laid-Open Patent Publication Nos. 2018-173936 and 2020-187649.

SUMMARY

According to an aspect of the embodiments, there is provided a non-transitory computer-readable recording medium that stores a control program causing a computer to execute a process, the process including: determining whether first microcode stored in a first area of a storage device supports a processor; and when the first microcode does not support the processor, decompressing one of multiple sets of compressed second microcode stored in a second area of the storage device into the first area.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4A illustrates a correspondence relationship between the CPU and a code, and FIG. 4B schematically illustrates a compression order table.

DESCRIPTION OF EMBODIMENTS

Prior to the description of the present embodiment, what the inventor studied will be described.

Figure 1:
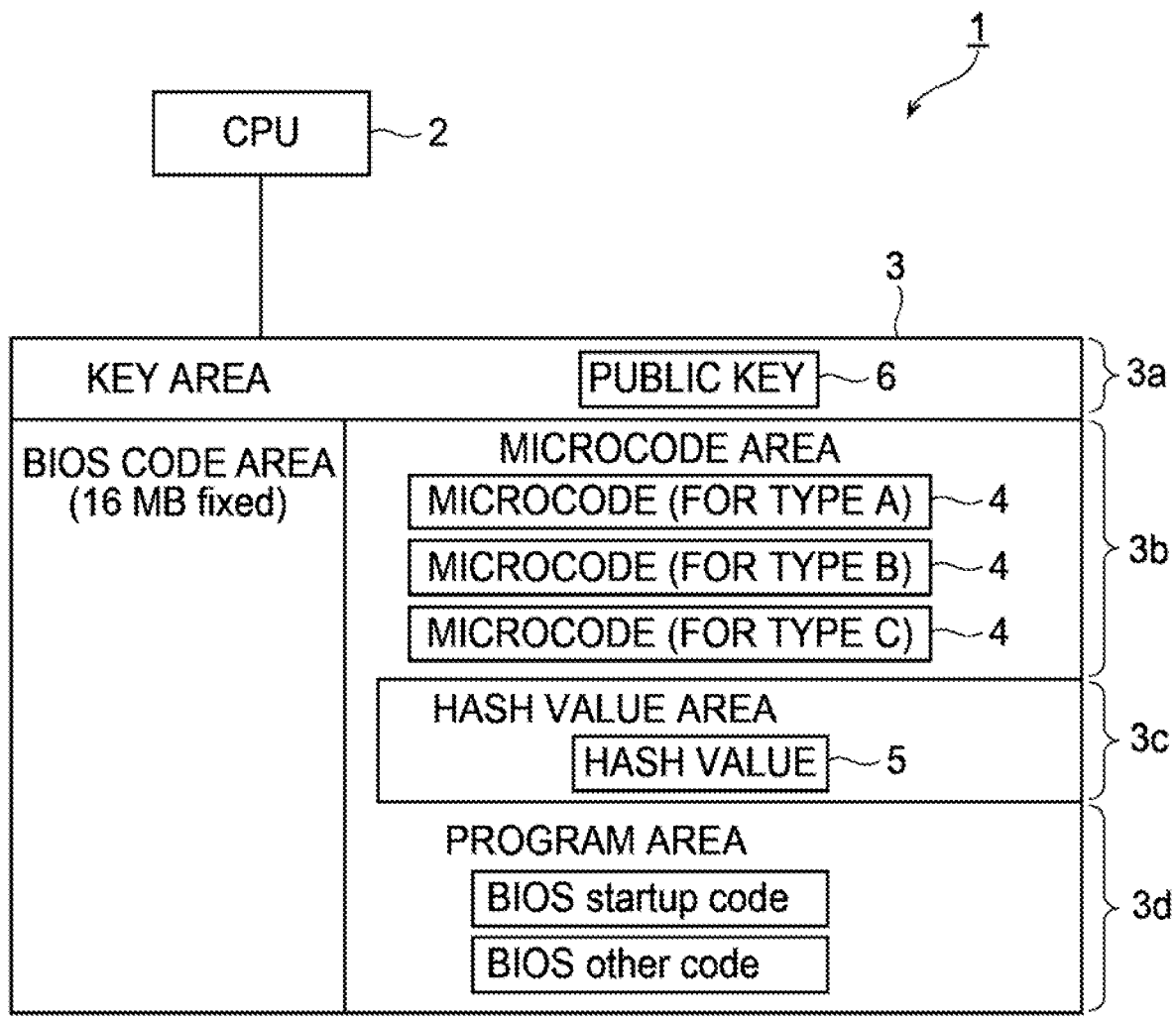
FIG. 1 is a hardware configuration diagram of a computer used in the study.

FIG. 1 is a hardware configuration diagram of a computer used in the study. As illustrated in FIG. 1, a computer 1 includes a CPU 2 and a storage device 3. The storage device 3 is a ROM that stores a BIOS program, and includes a key area 3a, a microcode area 3b, a hash value area 3c, and a program area 3d.

The microcode area 3b is an area that stores microcode 4 for the CPU 2. As described above, the microcode 4 is firmware defined for each type of the CPU 2. Thus, when there are multiple possible types of the CPU 2 to be installed in the computer 1, multiple sets of the microcode 4 corresponding to respective types are stored in the microcode area 3b. The example of FIG. 1 assumes that multiple sets of the microcode 4 corresponding to respective types "A", "B", and "C" of the CPU 2 are stored in the microcode area 3b.

The hash value area 3c is an area that stores a hash value 5 of the combined area of the microcode area 3b and the program area 3d. The hash value 5 is stored in the hash value area 3c in encrypted form. Both the microcode 4 and the hash value 5 are uncompressed data.

The key area 3a is an area that stores a public key 6 corresponding to a private key for encrypting the hash value 5. The program area 3d is an area that stores the BIOS program. As an example, the program area 3d stores startup code that is executed when the BIOS is booted and other code.

Next, a description will be given of a process executed by the CPU 2.

Figure 2:
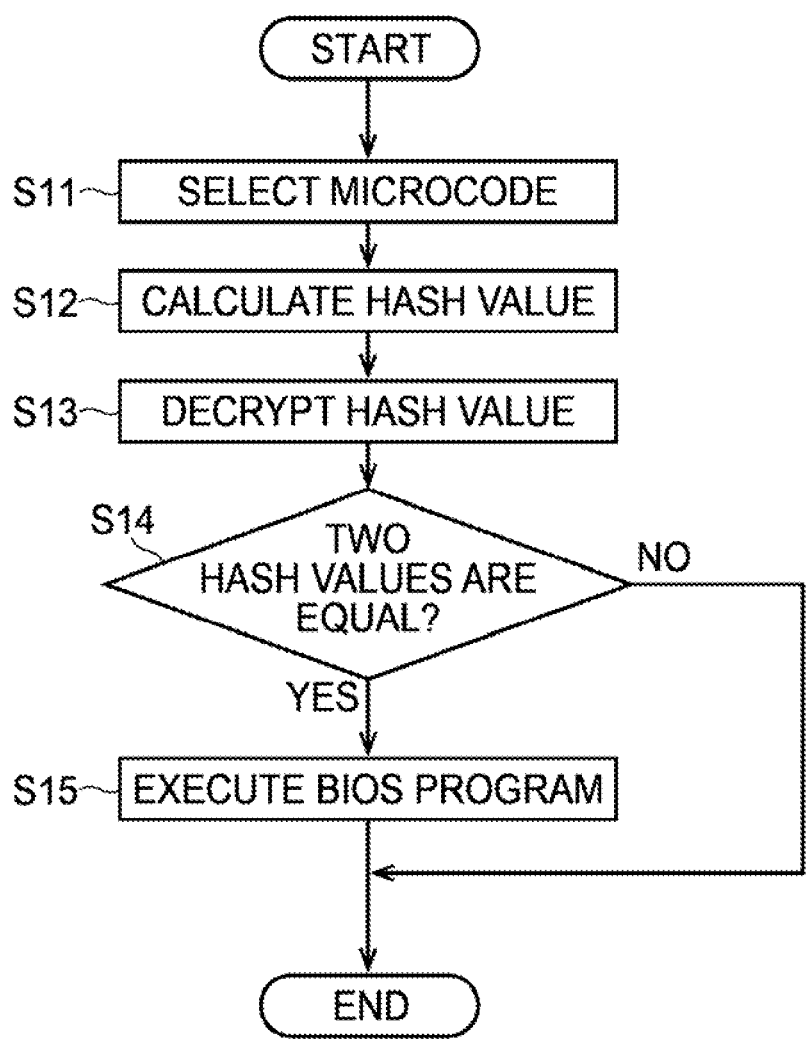
FIG. 2 is a flowchart of a process executed by a CPU.

FIG. 2 is a flowchart of the process executed by the CPU 2. First, the CPU 2 selects the microcode 4 corresponding to its own type from among the multiple sets of the microcode 4 in the microcode area 3b (step S11). For example, when the type of the CPU 2 is "A", the CPU 2 selects and applies the microcode 4 for the type "A".

Then, the CPU 2 calculates the hash value of the combined area of the microcode area 3b and the program area 3d using the same hash function as when the hash value 5 was calculated (step S12).

The CPU 2 then decrypts the hash value 5 stored in the hash value area 3c using the public key 6 in the key area 3a (step S13).

Thereafter, the CPU 2 determines whether the hash value 5 decrypted in step S13 is equal to the hash value calculated in step S12 (step S14). When the determination is NO, the process ends.

When the determination in step S14 is YES, the process proceeds to step S15. In step S15, the CPU 2 executes the BIOS program in the program area 3d. In the above described manner, the basic process executed by the CPU 2 in accordance with this example is completed.

In this example, as illustrated in FIG. 1, multiple sets of the microcode 4 corresponding to respective types of the CPU 2 are stored in the microcode area 3b. However, as the CPU 2 is more sophisticated, the size of the microcode 4 is becoming larger, and it is becoming difficult to store multiple sets of the microcode 4 in the microcode area 3b.

In addition, the number of the types of the CPU 2 supported by one BIOS is also increasing, and it is difficult to store all sets of the microcode 4 corresponding to all types of the CPU 2 supported by one BIOS in the microcode area 3b.

In addition, as the generation of the CPU 2 increases, the amount of code of the BIOS program increases, resulting in an increase in the program area 3d. This is reducing the available space, which can be used as the microcode area 3b, of the storage device 3.

Hereinafter, a description will be given of an embodiment that can store multiple sets of microcode in a storage device.

Embodiment

Figure 3:
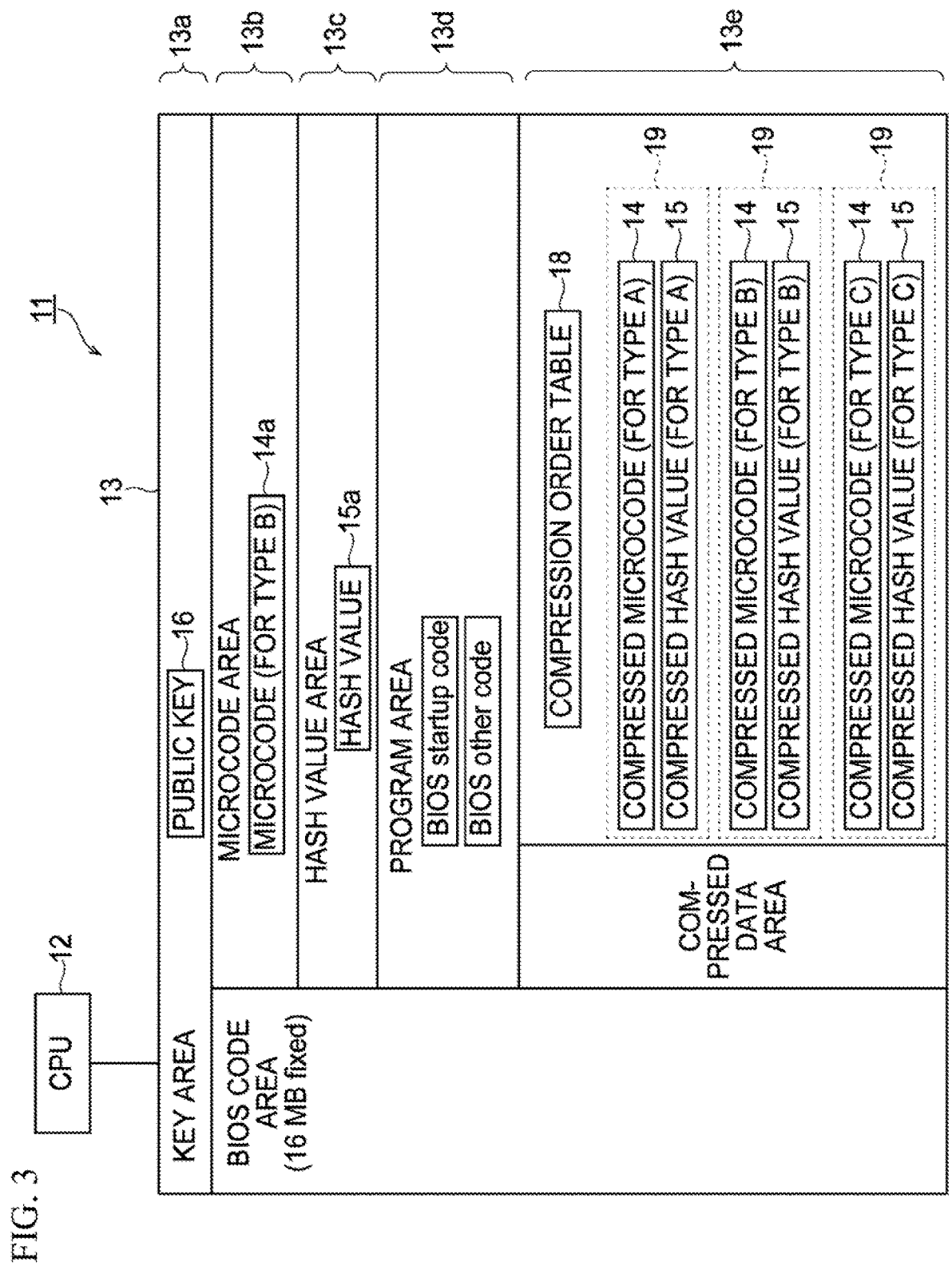
FIG. 3 is a hardware configuration diagram of an information processing device in accordance with a present embodiment.

FIG. 3 is a hardware configuration diagram of an information processing device in accordance with the present embodiment. An information processing device 11 is a computer such as a server or a PC (personal computer), and includes a CPU 12 and a storage device 13.

The storage device 13 is a ROM that stores a BIOS program, and includes a key area 13a, a microcode area 13b, a hash value area 13c, a program area 13d, and a compressed data area 13e.

The microcode area 13b is an example of a first area, and is an area that stores uncompressed microcode 14a for the CPU 12. Unlike the example of FIG. 1, in the present embodiment, only the uncompressed microcode 14a corresponding to one of multiple types of the CPU 12 is stored in the microcode area 13b. Here, illustrated is the case in which microcode 14 supporting the CPU 12 of the type "B" of the types "A", "B", and "C" is stored in the microcode area 13b. The microcode 14 supporting the CPU 12 of the type "B" is an example of first microcode. Instead of the type of the CPU 12, the product number or the like for identifying the CPU 12 may be employed.

The hash value area 13c is an example of a third area, and is an area that stores an uncompressed hash value 15a of the combined area of the microcode area 13b and the program area 13d. A hash value 15 is stored in the hash value area 13c in encrypted form.

The key area 13a is an area that stores a public key 16 corresponding to the private key for encrypting the uncompressed hash value 15a. The program area 13d is an area that stores the BIOS program. As an example, the program area 13d stores startup code that is executed when the BIOS is booted, and other code.

The compressed data area 13e is an example of a second area, and is an area that stores multiple sets of the compressed microcode 14, the compressed hash values and a compression order table 18.

Each set of the compressed microcode 14 is the microcode corresponding to one of all possible types of the CPU 12 to be installed in the information processing device 11. This example assumes that all possible types of the CPU 12 to be installed in the information processing device 11 are "A", "B", and "C". In this case, the compressed microcode 14 corresponding to each of the types "A", "B", and "C" is stored in the compressed data area 13e.

The compressed hash value 15 is data obtained by compressing the encrypted hash value of the combined area of the microcode area 13b and the program area 13d when one of the multiple sets of the compressed microcode 14 is decompressed into the microcode area 13b. For example, discussed is the case that the microcode 14 corresponding to the type "A" is decompressed into the microcode area 13b. In this case, the data obtained by compressing the encrypted hash value of the combined area of the microcode area 13b and the program area 13d becomes the compressed hash value 15 corresponding to the type "A".

Hereinafter, the compressed microcode 14 and the compressed hash value corresponding to the same type of the CPU 12 are referred to together as compressed data 19.

The compression algorithm used to obtain the compressed microcode 14 and the compressed hash value 15 in the compressed data area 13e is not particularly limited. In this example, the program "Tiano compression" of Intel Corporation is used to compress data.

The compression order table 18 is an example of correspondence information, and is information that stores an identifier for identifying each of the multiple sets of the compressed microcode 14 and an address of the storage device 13 in which each set of the compressed microcode 14 is stored, in association with each other.

Here, as illustrated in FIG. 4A, it is assumed that a code is assigned to the type of the CPU 12. FIG. 4A illustrates the correspondence relationship between the CPU 12 and the code.

The code is an integer for uniquely identifying each of the types of the CPU 12. In this example, the code for the type "A" is "10", and the codes are incremented by one in the order of the types "B" and "C".

FIG. 4B schematically illustrates the compression order table 18. As illustrated in FIG. 4B, the compression order table 18 is information that stores an index and an address offset in association with each other. The index is an identifier for uniquely identifying each of the multiple sets of the compressed microcode 14. Here, the index for the microcode 14 corresponding to a certain type of the CPU 12 is defined as the difference between the code for the certain type and the code for the type "A". For example, the index for the compressed microcode 14 corresponding to the type "B" is 1 (=11−10).

The address offset is the offset between the address of the storage device 13 in which the compressed microcode 14 for the type "A" is stored and the address of the storage device 13 in which the compressed microcode 14 for the certain type is stored. In the example of FIG. 4B, the offset between the address of the microcode 14 for the type "C" and the address of the compressed microcode 14 for the type "A" is "0850h" in hexadecimal. Instead of the address offset, the address itself of each compressed microcode 14 in the storage device 13 may be used.

Next, a description will be given of a process executed when data is stored in the storage device 13.

Figure 5:
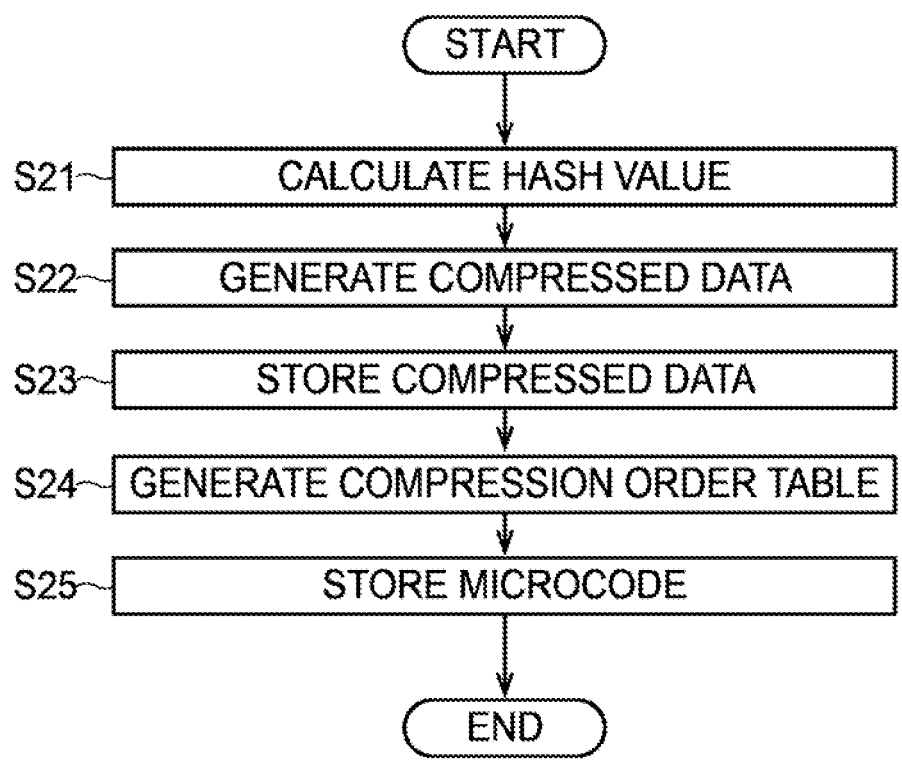
FIG. 5 is a flowchart of an exemplary process executed when data is stored in a storage device.

FIG. 5 is a flowchart of an exemplary process executed when data is stored in the storage device 13. Hereinafter, it is assumed that each step is executed by a computer such as a PC or a server. The computer may be the same as the information processing device 11, or may be a computer different from the information processing device 11.

First, the computer calculates the hash value 15 when the compressed microcode 14 supporting the CPU 12 of the type "A" is stored in the microcode area 13b (step S21). Similarly, the computer calculates the hash value 15 when the compressed microcode 14 supporting the CPU 12 of each of the types "B" and "C" is stored in the microcode area 13b.

Then, the computer encrypts the compressed hash value 15 corresponding to the type "A" using the private key, and generates the compressed data 19 by compressing the encrypted hash value 15 and the microcode 14 for the type "A" (step S22). Similarly, the computer generates the compressed data 19 corresponding to each of the types "B" and "C".

Then, the computer stores the compressed data 19 corresponding to each of the types "A" to "C" in the compressed data area 13e (step S23).

Then, the computer generates the compression order table 18 by relating the index to the address offset of each compressed microcode 14 (step S24).

Then, the computer stores the default uncompressed microcode 14a in the microcode area 13b (step S25). For example, the computer decompresses the microcode 14 corresponding to the type B as the default compressed microcode 14, and stores it in the microcode area 13b as the uncompressed microcode 14a.

In the above described manner, the basic process when data is stored in the storage device 13 is completed.

Next, the functional configuration of the information processing device 11 in accordance with the present embodiment will be described.

Figure 6:
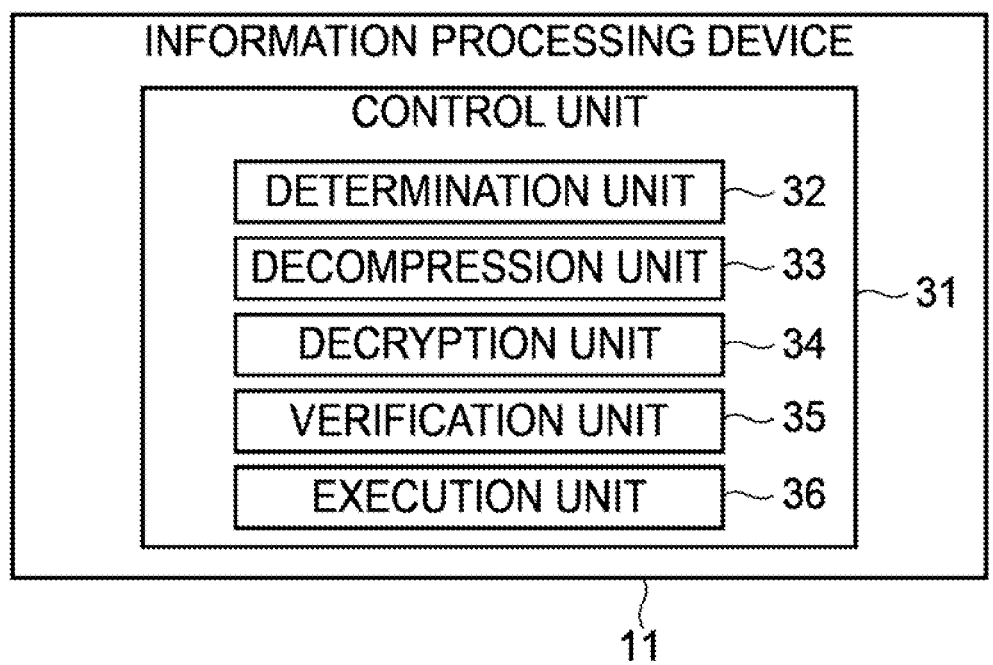
FIG. 6 is a functional block diagram of the information processing device in accordance with the present embodiment.

FIG. 6 is a functional block diagram of the information processing device 11 in accordance with the present embodiment. As illustrated in FIG. 6, the information processing device 11 includes a control unit 31. The control unit 31 is a processing unit that controls each component of the information processing device 11, and is implemented by the CPU 12 and the storage device 13 cooperatively executing a control program in accordance with the present embodiment.

As an example, the control unit 31 includes a determination unit 32, a decompression unit 33, a decryption unit 34, a verification unit 35, and an execution unit 36.

The determination unit 32 is a processing unit that determines whether the uncompressed microcode 14a stored in the microcode area 13b of the storage device 13 supports the CPU 12. The decompression unit 33 is a processing unit that decompresses one of the multiple sets of the compressed microcode 14 stored in the compressed data area 13e of the storage device 13 into the microcode area 13b. Furthermore, the decompression unit 33 decompresses the compressed encrypted hash value 15, which is in the compressed data area 13e, into the hash value area 13c in encrypted form as the uncompressed hash value 15a.

The decryption unit 34 is a processing unit that decrypts the uncompressed hash value 15a stored in the hash value area 13c using the public key 16 corresponding to the private key used to encrypt the uncompressed hash value 15a.

The verification unit 35 is a processing unit that verifies the uncompressed microcode 14a using the hash value decrypted by the decryption unit 34.

The execution unit 36 is a processing unit that executes the BIOS program stored in the program area 13d.

Next, a description will be given of a control method in accordance with the present embodiment.

Figure 7:
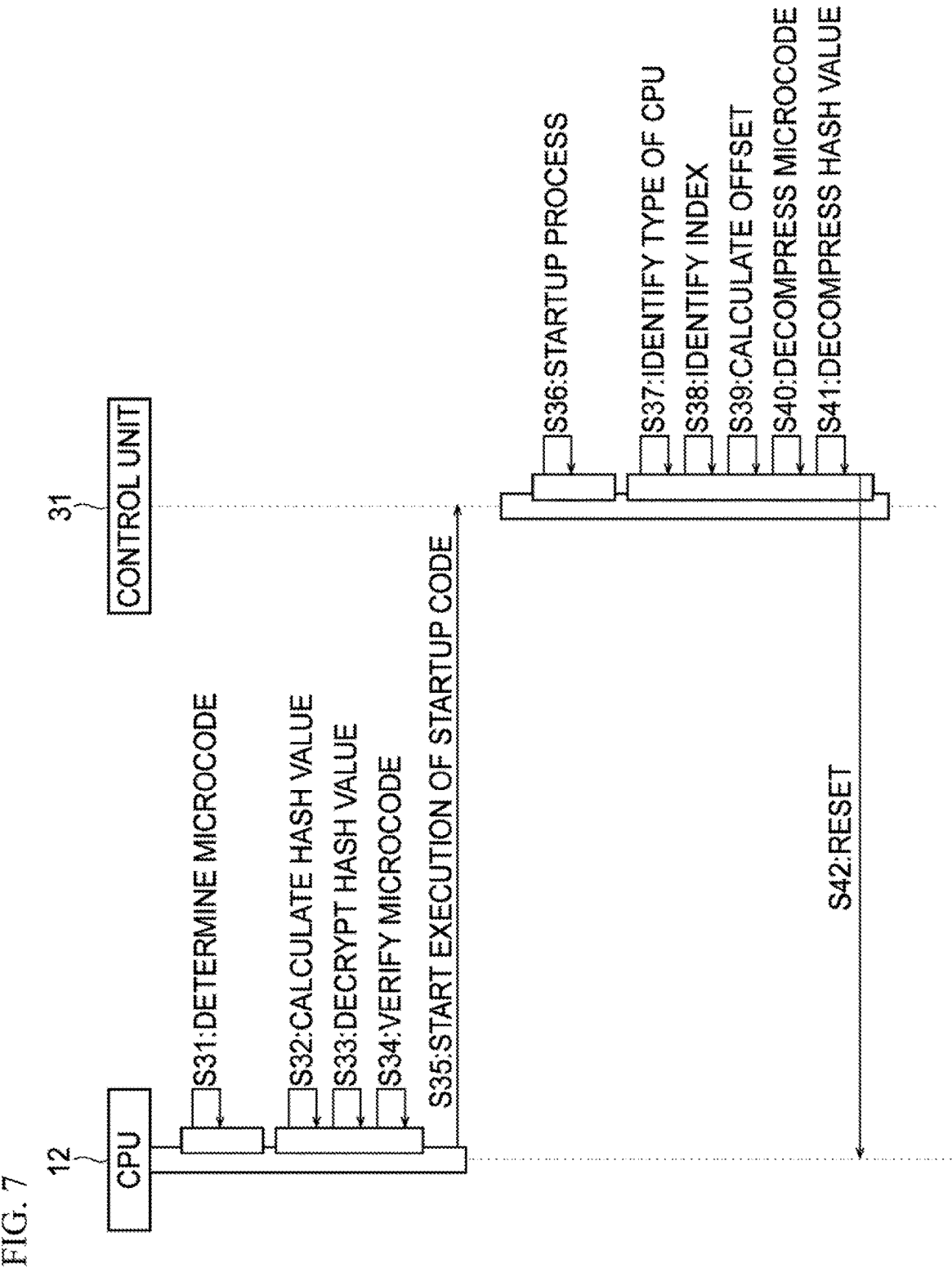
FIG. 7 is a sequence diagram of a control method in accordance with the present embodiment.

FIG. 7 is a sequence diagram of the control method in accordance with the present embodiment. First, the determination unit 32 determines whether the compressed microcode 14 stored in the microcode area 13b supports the CPU 12 actually installed in the information processing device 11 (step S31).

Then, the verification unit 35 calculates the hash value of the combined area of the microcode area 13b and the program area 13d (step S32).

The decryption unit 34 then decrypts the uncompressed hash value 15a stored in the hash value area 13c using the public key 16 (step S33).

Then, the verification unit 35 verifies the authenticity of the uncompressed microcode 14a stored in the microcode area 13b (step S34). The verification unit 35 determines that the uncompressed microcode 14a is not falsified and is authentic when the hash value calculated in step S32 is equal to the hash value obtained by the decryption in step S33. On the other hand, when these hash values are different, the verification unit 35 determines that the uncompressed microcode 14a is falsified and is not authentic.

Here, discussed is the case that it is determined that the uncompressed microcode 14a of the microcode area 13b supports the current CPU 12 in step S31 and it is determined that the uncompressed microcode 14a is authentic by the verification. In this case, the execution unit 36 executes the BIOS program, and the process ends.

On the other hand, when it is determined that the uncompressed microcode 14a in the microcode area 13b does not support the CPU 12 in step S31, and that the uncompressed microcode 14a is authentic by the verification, the process proceeds to step S35.

In step S35, the execution unit 36 starts the execution of the startup code in the program area 13d.

Thereafter, the execution unit 36 executes a startup process such as the initialization of the memory stack area (not illustrated) (step S36).

Then, the determination unit 32 identifies the type of the CPU 12 (step S37).

The determination unit 32 then identifies the index corresponding to the type of the CPU 12 identified in step S37 (step S38). For example, as illustrated in FIG. 4B, when the type of the CPU is "B", the index is "11". The method of identifying the index is not particularly limited. For example, as illustrated in FIG. 4A, the information indicating the correspondence relationship between the CPU 12 and the code may be stored in the storage device 13 in advance, and the determination unit 32 may identify the index based on the code included in this information.

Then, the determination unit 32 calculates the offset (step S39). As described above, the offset is defined as the difference between the index corresponding the type "A" of the CPU 12 and the index of the type of the current CPU 12. For example, the type of the current CPU is "B", the index is 1 (=11−10).

The decompression unit 33 then decompresses one of the multiple sets of the compressed microcode 14 stored in the compressed data area 13e into the microcode area 13b as the uncompressed microcode 14 (step S40). For example, the decompression unit 33 refers to the compression order table 18 to identify the address offset corresponding to the index calculated in step S39. Then, the decompression unit 33 decompresses the compressed microcode 14 stored in the identified address offset, and writes the decompressed microcode 14 in the microcode area 13b as the uncompressed microcode 14a.

The decompression unit 33 then decompresses the compressed hash value corresponding to the uncompressed microcode 14a decompressed in step S40 into the hash value area 13c (step S41). For example, the decompression unit 33 decompresses the compressed hash value 15 corresponding to the microcode 14 decompressed in step S40, and writes the decompressed encrypted hash value 15a into the hash value area 13c.

Then, the execution unit 36 resets the CPU 12 (step S42). Thereafter, the process returns to step S31 again.

In the above described manner, the basic process of the control method in accordance with the present embodiment is completed.

In the present embodiment described above, multiple sets of the compressed microcode 14 corresponding to respective types of the CPU 12 are stored in the compressed data area 13e in advance. Thus, compared with the case in which the microcode 14 is not compressed, the size of each of the multiple sets of the compressed microcode 14 can be reduced, and the multiple sets of the microcode 14 can be stored in the storage device 13 with a limited data capacity.

Further, when the uncompressed microcode 14a in the microcode area 13b does not correspond to the type of the CPU 12, the decompression unit 33 decompresses one of the sets of the compressed microcode 14 into the microcode area 13b. This allows the storage device 13 to support multiple types of the CPU 12.

Furthermore, the decompression unit 33 refers to the compression order table 18 to identify the address offset corresponding to the type of the CPU 12, and decompresses the compressed microcode 14 stored in the address offset into the microcode area 13b. This allows the decompression unit 33 to decompress the microcode corresponding to the type of the current CPU 12 into the microcode area 13b even when the uncompressed microcode 14 stored in the microcode area 13b does not correspond to the type of the current CPU 12.

In addition, the decompression unit 33 decompresses the compressed hash value 15 corresponding to the uncompressed microcode 14a in the microcode area 13b, and stores it in the hash value area 13c as the uncompressed hash value 15a. This allows the verification unit 35 to verify the authenticity of the uncompressed microcode 14a using the uncompressed hash value 15a.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A non-transitory computer-readable recording medium that stores a control program causing a computer to execute a process, the process comprising:
   determining whether first microcode stored in a first area of a storage device supports a processor; and
   when the first microcode does not support the processor, decompressing one of multiple sets of compressed second microcode stored in a second area of the storage device into the first area.

2. The non-transitory computer-readable recording medium according to claim 1,
   wherein the storage device stores correspondence information that stores an identifier for identifying each of the multiple sets of compressed second microcode and each of addresses of the multiple sets of compressed second microcode in the second area in association with each other, and
   wherein the decompressing of the one of the multiple sets of compressed second microcode includes referring to the correspondence information to identify an address that is associated with the identifier corresponding to the processor, and decompressing a first set of compressed second microcode of the multiple sets of compressed second microcode into the first area, the first set of compressed second microcode being stored in the address identified.

3. The non-transitory computer-readable recording medium according to claim 1,
   wherein an encrypted hash value of each of the multiple sets of compressed second microcode is stored in the second area in compressed form, and
   wherein when the one of the multiple sets of compressed second microcode is decompressed into the first area, the encrypted hash value corresponding to the one of the multiple sets of compressed second microcode is decompressed into a third area of the storage device.

4. The non-transitory computer-readable recording medium according to claim 3,
   wherein the storage device stores a public key corresponding to a private key used to encrypt a hash value to obtain the encrypted hash value,
   wherein the process further comprises:
   decrypting the encrypted hash value using the public key to obtain a decrypted hash value, and
   verifying the first microcode using the decrypted hash value.

5. A control method implemented by a computer, the control method comprising:
   determining whether first microcode stored in a first area of a storage device supports a processor; and
   when the first microcode does not support the processor, decompressing one of multiple sets of compressed second microcode stored in a second area of the storage device into the first area.

6. An information processing device comprising:
   a memory; and
   a processor coupled to the memory and configured to:
   determine whether first microcode stored in a first area of a storage device supports the processor, and
   when the first microcode does not support the processor, decompress one of multiple sets of compressed second microcode stored in a second area of the storage device into the first area.

* * * * *